United States Patent [19]
Hinton et al.

[11] Patent Number: 6,092,628
[45] Date of Patent: Jul. 25, 2000

[54] APPARATUS AND METHOD FOR CONTROLLING TEMPERATURE OF FLUID IN A DIFFERENTIAL ASSEMBLY

[75] Inventors: David Hinton, Mt. Zion; Douglas W. Bell, Mattoon; Charles N. Goloff, Secor, all of Ill.

[73] Assignee: Caterpillar, Inc., Peoria, Ill.

[21] Appl. No.: 09/196,043

[22] Filed: Nov. 19, 1998

Related U.S. Application Data

[60] Provisional application No. 60/102,064, Sep. 28, 1998.

[51] Int. Cl.[7] .................................................. F01M 9/06
[52] U.S. Cl. .................... 184/6.22; 184/104.1; 74/606 A
[58] Field of Search ................................. 184/6.21, 6.22, 184/6.23, 6.12, 104.1, 106, 65, 68, 6.26; 74/467, 468, 606 R, 607, 606 A

[56] References Cited

U.S. PATENT DOCUMENTS

| | | | |
|---|---|---|---|
| 3,486,582 | 12/1969 | Carter et al. ................................. | 184/6 |
| 4,235,307 | 11/1980 | Browning et al. ..................... | 184/6.12 |
| 4,667,774 | 5/1987 | Roberge ................................. | 184/6.12 |
| 4,721,184 | 1/1988 | Sowards ................................. | 184/6.12 |
| 4,762,201 | 8/1988 | Malik ..................................... | 184/6.13 |
| 4,769,978 | 9/1988 | Reichen et al. ......................... | 56/12.3 |
| 5,115,887 | 5/1992 | Smith ..................................... | 184/6.4 |
| 5,540,300 | 7/1996 | Downs et al. ......................... | 184/11.2 |
| 5,568,842 | 10/1996 | Otani ..................................... | 184/6.22 |
| 5,584,773 | 12/1996 | Kershaw et al. ......................... | 475/160 |
| 5,599,100 | 2/1997 | Jackson et al. ......................... | 366/152.5 |
| 5,662,188 | 9/1997 | Ito et al. ................................. | 184/6.3 |
| 5,839,327 | 11/1998 | Cage ..................................... | 74/607 |
| 5,937,817 | 8/1999 | Schanz et al. .................... | 123/196 AB |
| 5,997,372 | 12/1999 | Idzikowski et al. ....................... | 440/88 |

*Primary Examiner*—David M. Fenstermacher
*Attorney, Agent, or Firm*—Maginot, Addison & Moore

[57] ABSTRACT

An apparatus for controlling temperature of fluid in a differential assembly. The apparatus includes a differential housing having a number of sidewalls which collectively define an internal component chamber, wherein (i) the internal component chamber has a differential sump located therein, and (ii) the differential sump has a sump input port defined therein. The apparatus also includes a first operational pressure source which advances fluid from the internal component chamber of the differential housing. The apparatus further includes a diverter valve which receives fluid advanced by the first operational pressure source from the internal component chamber. The diverter valve has a cold fluid output port and a hot fluid output port. A heating fluid return line is interposed between the cold fluid output port of the diverter valve and the sump input port of the differential sump. A cooling fluid return line is interposed between the hot fluid output port of the diverter valve and the housing input port of the differential housing. The diverter valve is selectively operable between (i) a heating position in which fluid advanced by the first operational fluid source is diverted to the differential sump of the differential housing via the heating fluid return line and (ii) a cooling position in which fluid advanced by the first operational fluid source is diverted to contact the number of sidewalls of the differential housing via the cooling fluid return line. A method of controlling temperature of fluid in a differential housing is also presented.

20 Claims, 3 Drawing Sheets

APPARATUS AND METHOD FOR CONTROLLING TEMPERATURE OF FLUID IN A DIFFERENTIAL ASSEMBLY

This application claims the benefit of U.S. Provisional Application Ser. No. 60/102,064, filed Sep. 28, 1998.

TECHNICAL FIELD OF THE INVENTION

The present invention relates generally to a differential assembly of a work machine, and more particularly to an apparatus and method for controlling the temperature of fluid in a differential assembly.

BACKGROUND OF THE INVENTION

Work machines, such as mining trucks, typically include a left axle, a right axle, and a differential assembly which mechanically couples the right and left axle. The differential assembly allows the right and left axles to rotate at different speeds relative to one another as the work machine is driven in a curved path.

The differential assembly includes a right wheel group and a left wheel group. In addition, the differential assembly has an internal component chamber which houses a number of components. For example, the internal component chamber houses side gears and pinion gears. Adequate lubrication of the aforementioned components by a fluid, such as oil, is an important factor in maintaining the proper operation of the differential assembly. For example, the oil contained within the differential assembly must adequately lubricate the right wheel group and the left wheel group in order for the work machine to operate properly.

Moreover, having the oil within an appropriate predetermined temperature range is also an important factor in maintaining the proper operation of the differential assembly. For example, during cold start up conditions the oil contained within the internal component chamber must be heated to be within the appropriate predetermined temperature range. On the other hand, once the work machine begins performing various work functions, the oil must be cooled such that the oil is maintained within the predetermined temperature range.

Some differential assembly designs maintain a level of oil in the internal component chamber such that the gears contained therein are continuously in contact with the oil pooled therein. Having the gears in contact with the pooled oil results in the oil being heated due to the physical interaction between the oil and the gears. Specifically, the rotation of the gears through the pool of oil causes the temperature of the oil to rise. While rotating the gears through the pool of oil is an effective method of heating the oil, it also requires a significant amount of power. Therefore, having the gears contained within the internal component chamber of the differential assembly continuously in contact with a pool of oil results in the work machine losing a significant amount of horse power as the gears are rotated through the oil. This particularly true when the gears being rotated through the pool of oil are relatively large as is the case with mining trucks.

What is needed therefore is an apparatus and method for controlling the temperature of fluid in a differential assembly which overcomes the above-mentioned drawback.

DISCLOSURE OF THE INVENTION

In accordance with a first embodiment of the present invention, there is provided an apparatus for controlling temperature of fluid in a differential assembly. The apparatus includes a differential housing having a number of sidewalls which collectively define an internal component chamber, wherein (i) the internal component chamber has a differential sump located therein, and (ii) the differential sump has a sump input port defined therein. The apparatus also includes a first operational pressure source which advances fluid from the internal component chamber of the differential housing. The apparatus further includes a diverter valve which receives fluid advanced by the first operational pressure source from the internal component chamber. The diverter valve has a cold fluid output port and a hot fluid output port. In addition, the apparatus includes a heating fluid return line interposed between the cold fluid output port of the diverter valve and the sump input port of the differential sump. The apparatus further includes a cooling fluid return line interposed between the hot fluid output port of the diverter valve and the housing input port of the differential housing. The diverter valve is selectively operable between (i) a heating position in which fluid advanced by the first operational fluid source is diverted to the differential sump of the differential housing via the heating fluid return line and (ii) a cooling position in which fluid advanced by the first operational fluid source is diverted to contact the number of sidewalks of the differential housing via the cooling fluid return line.

In accordance with a second embodiment of the present invention, there is provided an apparatus for controlling temperature of fluid in a differential assembly. The apparatus includes a differential housing having a number of sidewalls which collectively define an internal component chamber, wherein (i) the internal component chamber has a differential sump located therein and (ii) the differential sump has a sump input port defined therein. The apparatus also includes a first operational pressure source which advances fluid from the internal component chamber of the differential housing. The apparatus further includes a diverter valve which receives fluid advanced by the first operational pressure source from the internal component chamber. The diverter valve has a cold fluid output port and a hot fluid output port. The apparatus also includes a heating fluid return line interposed between the cold fluid output port of the diverter valve and the sump input port of the differential sump. In addition, the apparatus includes a cooling fluid return line interposed between the hot fluid output port of the diverter valve and the housing input port of the differential housing. The apparatus also includes a second operational pressure source which advances fluid from the internal component chamber of the differential housing. The apparatus further includes a temperature sensor which is positioned in contact with fluid advanced by the second operational pressure source and generates a temperature signal in response thereto. The diverter valve is selectively operable between (i) a heating position in which fluid advanced by the first operational fluid source is diverted to the differential sump of the differential housing via the heating fluid return line and (ii) a cooling position in which fluid advanced by the first operational fluid source is diverted to contact the number of sidewalls of the differential housing via the cooling fluid return line.

In accordance with a third embodiment of the present invention there is provided a method of controlling temperature of fluid in a differential housing. The method includes the steps of (i) advancing fluid with a pump from an internal component chamber of the differential housing into a diverter valve, (ii) determining temperature of fluid in the internal component chamber, (iii) diverting fluid advanced by the pump with the diverter valve to a location within a differential sump positioned within the internal component chamber of differential housing if the temperature of fluid within the internal component chamber is determined to have a predetermined relation with a temperature threshold, and (iv) diverting fluid advanced by the pump with the diverter valve such that fluid advanced by the pump contacts the number of sidewalls of the differential housing at a location outside of the differential sump if the temperature of fluid within the internal component chamber is determined not to have a predetermined relation with the temperature threshold.

BEST MODE FOR CARRYING OUT THE INVENTION

Figure 1:
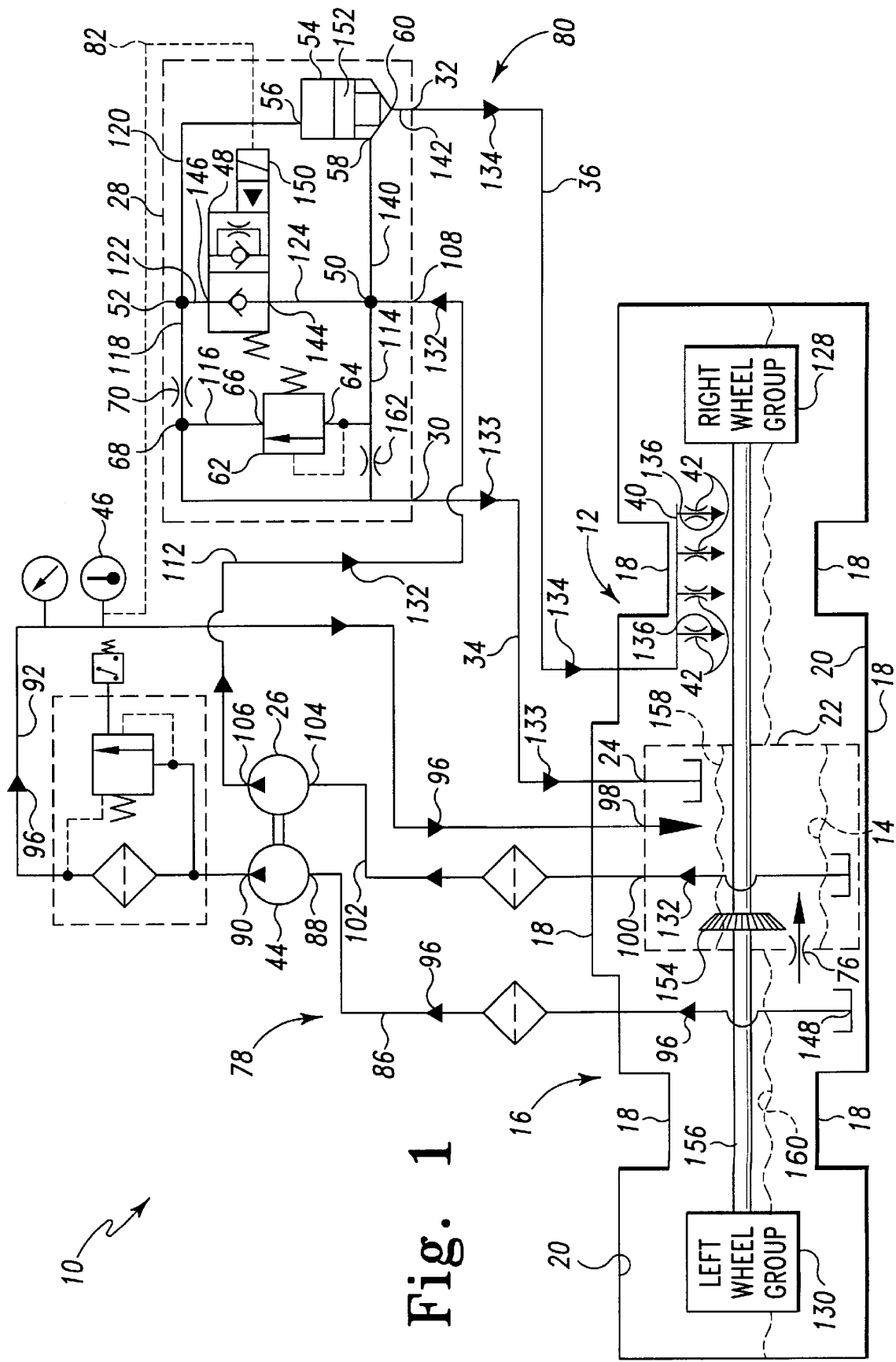
FIG. 1 is a schematic view of an apparatus for controlling the temperature of fluid in a differential assembly which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 2:
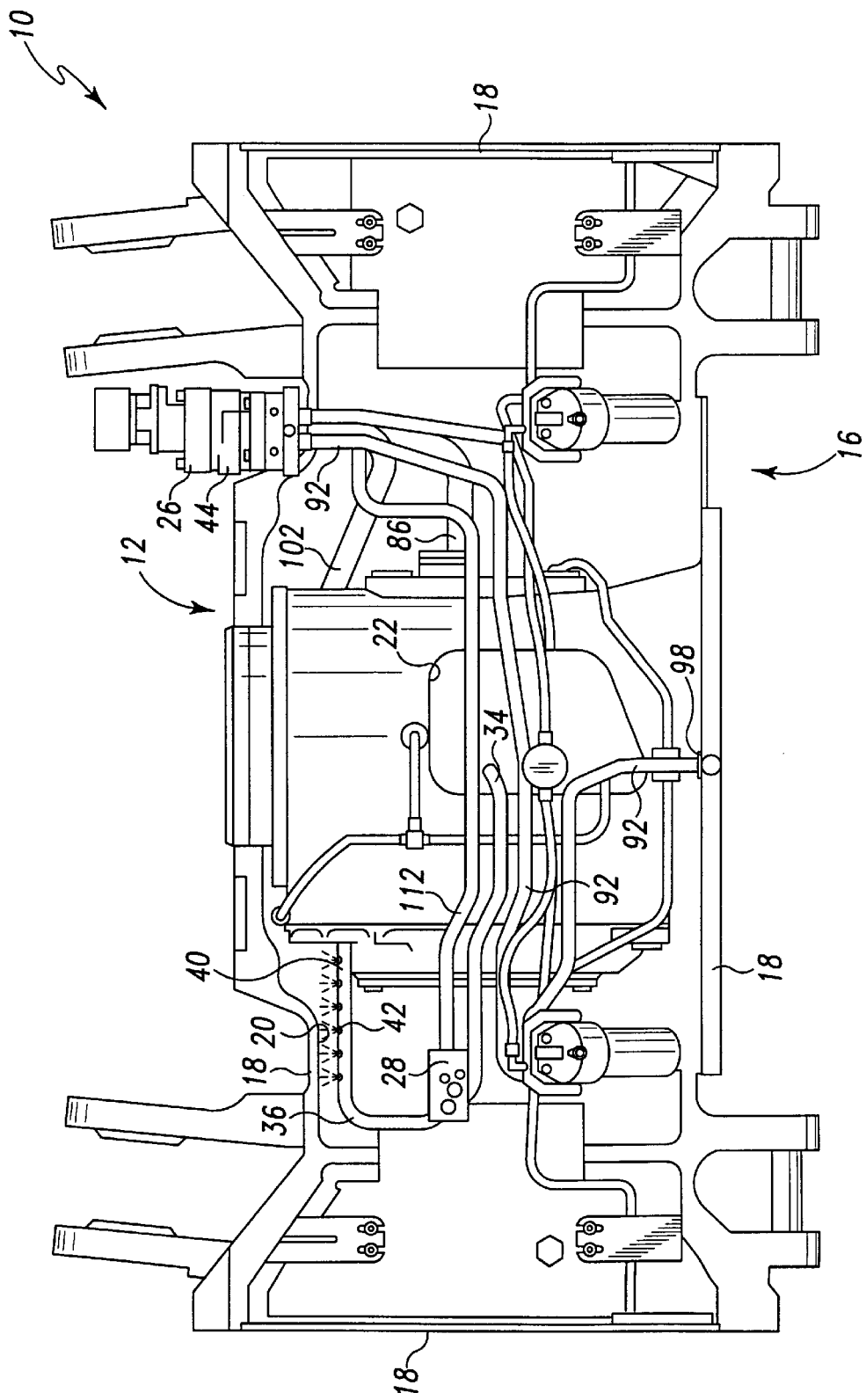
FIG. 2 is a top elevational view of the apparatus of FIG. 1 showing a number of the fluid lines and the differential sump thereof (note that the upper half of the differential housing has been removed in order to expose the fluid lines and the differential sump)
Figure 3:
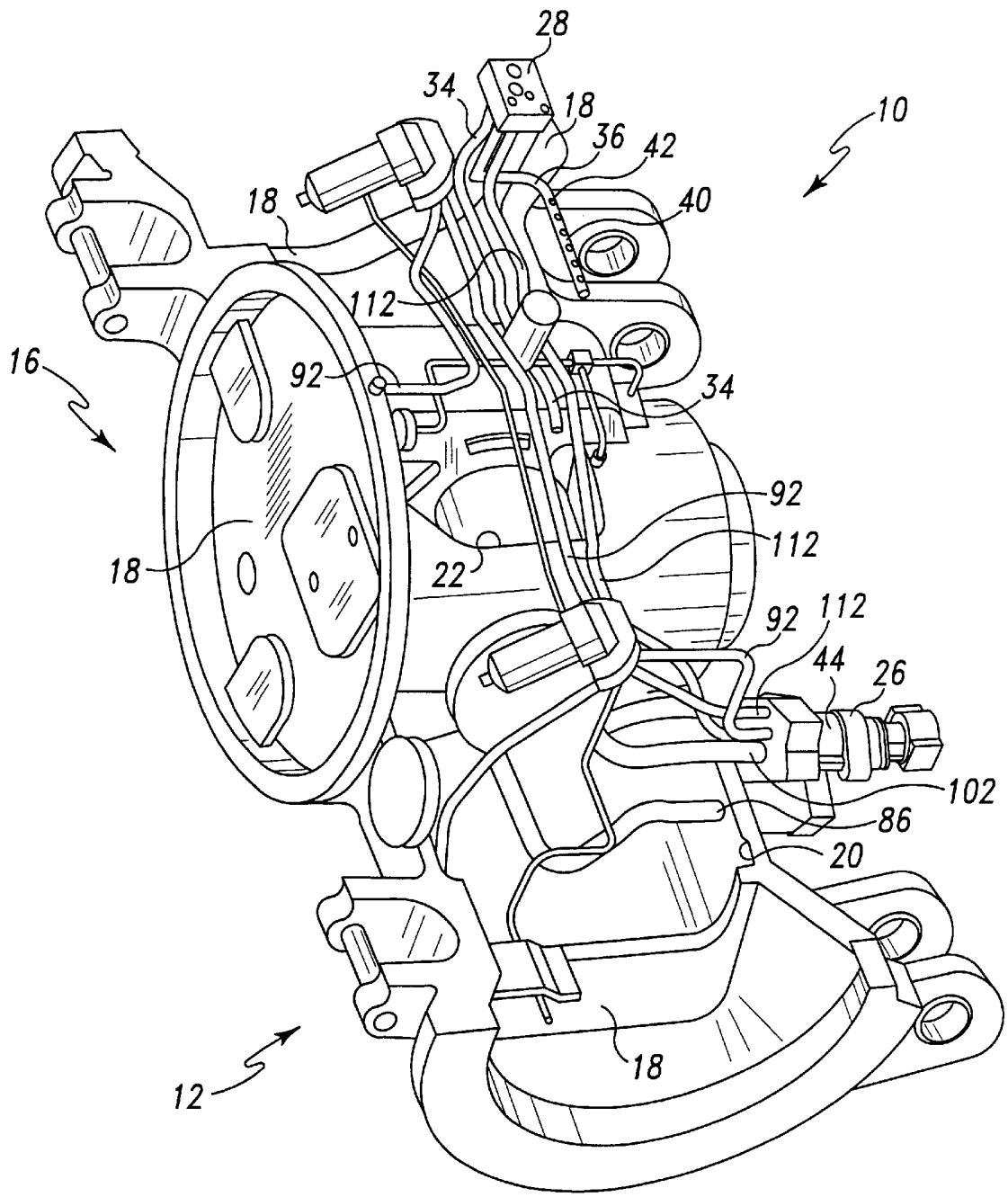
FIG. 3. is a perspective view of the apparatus of FIG. 1 showing a number of the fluid lines and the differential sump thereof (note that the upper half of the differential housing has been removed in order to expose the fluid lines and the differential sump).

Referring now to FIGS. 1, 2, and 3, there is shown an apparatus 10 for controlling temperature of fluid, such as oil, in a differential assembly 16 which incorporates the features of the present invention therein. Note that apparatus 10 and differential assembly 16 are incorporated into a work machine (not shown) such as a mining truck. Apparatus 10 includes a (i) differential housing 12 having a number of sidewalls 18 which collectively define a internal component chamber 20, (ii) a temperature sensing fluid circuit 78 (see FIG. 1), and (iii) a temperature controlling fluid circuit 80 (see FIG. 1).

Internal component chamber 20 of differential housing 12 has a differential sump 22, a right wheel group 128 (see FIG. 1), and a left wheel group 130 (see FIG. 1) located therein. Right wheel group 128 and left wheel group 130 are both mechanically coupled to an axle 156. Differential sump 22 has a sump input port 24, a sump input port 98, and a sump output port 100 (see FIG. 1) defined therein. As shown in FIG. 1, differential sump 22 also has a sump orifice 76 attached thereto. Sump orifice 76 allows fluid, such as oil, to flow within internal component chamber 20 from a location outside of differential sump 22 to a location within differential sump 22. Differential sump 22 also has a gear 154 positioned therein which is mechanically coupled to axle 156. Gear 154 rotates along with axle 156 as the work machine performs various work functions.

As shown more clearly in FIG. 1, temperature controlling fluid circuit 80 includes a first operational pressure source 26, a diverter valve 28, and a heating fluid return line 34. Temperature controlling fluid circuit 80 also includes a cooling fluid return line 36 having an end portion 40 with a number of orifices 42 defined therein (also see FIGS. 2 and 3).

First operational pressure source 26 has a pressure source inlet port 104 and a pressure source outlet port 106. Pressure source inlet port 104 of first operational pressure source 26 is coupled to differential sump 22 via a fluid line 102. It should be understood that fluid line 102 is positioned relative to differential sump 22 such that an end of fluid line 102 is submerged below a hot fluid level 14 and a cold fluid level 158 as schematically illustrated in FIG. 1. Having an end of fluid line 102 submerged in the above described manner allows first operational pressure source 26 to withdraw fluid (e.g. oil) from differential sump 22 through sump output port 100.

Pressure source outlet port 106 of first operational pressure source 26 is coupled to a diverter valve input port 108 via a fluid line 112. Having first operational pressure source 26 coupled to differential sump 22 and diverter valve 28 in the above described manner allows first operational pressure source 26 to advance fluid from within differential sump 22 to diverter valve 28 as indicated by arrowheads 132.

Diverter valve 28 is selectively operable between a heating position and a cooling position. Diverter valve 28 includes a poppet valve 48, a hot fluid return valve 54, a cold fluid return valve 62, a fixed orifice 70, and an orifice 162. Diverter valve 28 also has a cold fluid output port 30 and a hot fluid output port 32.

Poppet valve 48 is selectively positionable between an open poppet position and a closed poppet position. Poppet valve 48 has a poppet input 144 and a poppet output 146. One poppet valve 48 which can be used in the present invention is available from Fluid Power Systems Inc. of Lincolnshire Ill., as catalogue number CV1367. Poppet valve 48 is coupled to (i) an operational pressure source output junction 50 via a fluid line 124 and (ii) a poppet output junction 52 via a fluid line 122.

Hot fluid return valve 54 is selectively positionable between an open hot fluid return position and a closed hot fluid return position. Hot fluid return valve 54 has (i) a control input 56 coupled to poppet output junction 52 via a fluid line 120, (ii) a hot source input 58 coupled to operational pressure source output junction 50 via a fluid line 140, and (iii) a hot source output 60 coupled to hot fluid output port 32 and cooling fluid return line 36 via a fluid line 142. One hot fluid return valve 54 which can be used in the present invention is available from Fluid Power Systems Inc. of Lincolnshire Ill., as catalogue number SV1161.

End portion 40 of cooling fluid return line 36 is positioned within internal component chamber 20 of differential housing 12 at a location outside of differential sump 22. In addition, end portion 40 of cooling fluid return line 36 is positioned adjacent to a sidewall 18 of differential housing 12.

Cold fluid return valve 62 is selectively positionable between an open cold fluid return position and a closed cold fluid return position. Cold fluid return valve 62 has (i) a cold source input 64 coupled to operational pressure source output junction 50 via a fluid line 114 and (ii) a cold source output 66 coupled to a cold fluid return output junction 68 via a fluid line 116. One cold fluid return valve 62 which can be used in the present invention is available from Fluid Power Systems Inc. of Lincolnshire Ill., as catalogue number LE1368. Cold fluid return output junction 68 is coupled to heating fluid return line 34. Heating fluid return line is in fluid communication with sump input port 24 such that the fluid being discharged from an end of heating fluid return line 34 is discharged to a location within differential sump 22.

Fixed orifice 70 is coupled to cold fluid return output junction 68 and poppet output junction 52 via a fluid line 118 such that fixed orifice 70 is interposed therebetween. In addition, fixed orifice 70 is positioned relative to poppet valve 48 such that fixed orifice 70 is located down stream from poppet valve 48. Having fluxed orifice 70 positioned relative to poppet valve 48 in the above described manner results in apparatus 10 being less susceptible to fail as a result of contaminants contained within the fluid circulated therethrough.

Orifice 162 is coupled to fluid line 114 and functions to reduce pressure spikes in first operational pressure source 26. Orifice 162 also functions to aid in bleeding any air pockets present in the fluid circulated through apparatus 10.

Temperature sensing fluid circuit 78 includes a fluid line 86, a second operational pressure source 44, a fluid line 92 (also see FIGS. 2 and 3), and a temperature sensor 46. Second operational pressure source 44 has a inlet port 88 and an outlet port 90. Inlet port 88 of second operational pressure source 44 is in fluid communication with internal component chamber 20 of differential housing 12 via fluid line 86. It should be understood that inlet port 88 is in fluid communication with internal component chamber 20 so that second operational pressure source 44 withdraws fluid from internal component chamber 20 as indicated by arrowheads 96. In addition, it should be appreciated that that second operational pressure source 44 withdraws fluid from internal component chamber 20 at a location outside of differential sump 22.

Outlet port 90 of second operational pressure source 44 is coupled to differential sump 22 via fluid line 92 and sump input port 98. It should be appreciated that the above described arrangement allows second operational pressure source 44 to withdraw fluid from internal component chamber 20 at a location outside of differential sump 22 and return fluid to a location within differential sump 22 as indicated by arrowheads 96.

Temperature sensor 46 is positioned in contact with the fluid advanced through fluid line 92 by second operational pressure source 44. In addition, temperature sensor 46 is electrically coupled to poppet valve 48 by an electrical line 82. Temperature sensor 46 generates a temperature signal in response to being in contact with the fluid being advanced through fluid line 92. Note that sensor 46 is electrically coupled to a power source so as to generate the aforementioned temperature signal. The temperature signal is received by poppet valve 48 via electrical line 82.

INDUSTRIAL APPLICABILITY

During use of assembly 10, second operational pressure source 44 is operated so as to circulate fluid through temperature sensing fluid circuit 78. During the circulation, temperature sensor 46 continuously determines the temperature of the fluid being advanced through fluid line 92. In particular, second operational pressure source 44 is operated so as to advance fluid from internal component chamber 20 to a position located within differential sump 22 through a fluid path defined by fluid line 86 and fluid line 92. Preferably, second operational pressure source 44 advances the fluid in the above described manner at a rate of 30 gallons per minute. Note that temperature sensing fluid circuit 78 (i) withdraws fluid from internal component chamber 20 at a location outside of differential sump 22 and (ii) returns fluid to internal component chamber 20 at a location within differential sump 22.

As temperature sensing fluid circuit 78 is operated in the above described manner, temperature sensor 46 sends (i) a temperature on-signal or (ii) a temperature-off signal to poppet valve 48 via electrical line 82. If temperature sensor 46 sends a temperature-on signal to poppet valve 48, poppet valve 48 is positioned in the open poppet position. If temperature sensor 46 sends a temperature-off signal to poppet valve 48, poppet valve 48 is positioned in the closed poppet position. Specifically, if the temperature of the fluid circulating in sensing fluid circuit 78 is less than 120°, temperature sensor 46 sends a temperature on-signal to poppet valve 48 such that a solenoid 150 contained within poppet valve 48 is actuated. (Note that the above described temperature on signal can be an electrical current provided to solenoid 150 via wire 82. Also note that all temperatures referred to herein are in degrees Fahrenheit.) Actuating solenoid 150 positions poppet valve 48 in the open poppet position. Positioning poppet valve 48 in the open poppet position locates diverter valve 28 in the heating position.

On the other hand, if the temperature of the fluid circulating in sensing fluid circuit 78 is substantially equal to, or more than, 120°, temperature sensor 46 sends a temperature off-signal to poppet valve 48 such that solenoid 150 contained within poppet valve 48 is deactuated. (Note that the above described temperature off-signal can be the act of shutting off the electrical current provided to solenoid 150.) Deactuating solenoid 150 positions poppet valve 48 in the closed poppet position. Positioning poppet valve 48 in the closed poppet position locates diverter valve 28 in the cooling position.

While sensing fluid circuit 78 is operating in the above described manner, first operational pressure source 26 operates so as to advance fluid from within differential sump 22 to diverter valve input port 108. In particular, first operational pressure source 26 is operated so as to advance fluid from a location within differential sump 22 to diverter valve input port 108 through a fluid path defined by fluid line 102 and fluid line 112. Preferably, first operational pressure source 26 advances the fluid in the above described manner at a rate of 47 gallons per minute.

Once the fluid reaches diverter valve input port 108, the fluid will advance through either cold fluid return valve 62 or hot fluid return valve 54 depending upon whether poppet valve 48 is located in the open poppet position or the closed poppet position. In particular, if the temperature of the fluid is less than 120°, poppet valve 48 will be located in the open poppet position, thereby locating diverter valve 28 in the heating position. Having poppet valve 48 located in the open poppet position allows fluid to be advanced from operational pressure source output junction 50 through poppet valve 48 to poppet output junction 52. After reaching poppet output junction 52, the fluid advances (i) through fixed orifice 70 via fluid line 118 and (ii) to control input 56 of hot fluid return valve 54 via fluid line 120. It should be understood that the effective area ratios of fixed orifice 70 and control input 56 of hot fluid return valve 54 are designed so that a fluid back pressure is created in fluid lines 118 and 120 when fluid is being advanced through poppet valve 48 in the above described manner. This fluid back pressure causes a poppet 152 contained within hot fluid return valve 54 to move so as to prevent any fluid flow through hot source input 58 and hot source output 60 of hot fluid return valve 54. Preventing any fluid flow through hot source input 58 and hot source output 60 positions hot fluid return valve 54 in the closed hot fluid return position Having hot fluid return valve 54 in the closed hot fluid return position causes a fluid back pressure to build up in fluid lines 140 and 114 until a pressure substantially equal to 400 psi is attained. A pressure substantially equal to 400 psi is capable of overcoming a spring load in cold fluid return valve 62 which normally maintains cold fluid return valve 62 in the closed cold fluid return position. Therefore, once a fluid back pressure substantially equal to 400 psi is present in fluid line 114, the aforementioned spring load is overcome and cold fluid return valve 62 is moved from the closed cold fluid return position to the open cold fluid return position. Placing cold fluid return valve 62 in the open cold fluid return position allows fluid to (i) pass through cold source input 64 and cold source output 66 and (ii) be advanced to cola fluid return output junction 68 via fluid line 116. It should be understood that pressurizing the fluid to 400 psi in fluid line 114 and then allowing the fluid to pass through cold fluid return valve 62 in the above described manner heats the fluid. Once the fluid reaches cold fluid return output junction 68 as described above, the fluid is advanced back to a location within differential sump 22 via heating fluid return line 34 as indicated by arrowheads 133. Once located within differential sump 22 the fluid can be recirculated through temperature controlling fluid circuit 80.

However, if the temperature of the fluid is equal to, or greater than, 120°, poppet valve 48 is located in the closed poppet position, thereby locating diverter valve 28 in the cooling position. Having poppet valve 48 located in the closed poppet position prevents any fluid being advanced through poppet output junction 52 to fluid lines 118 and 120. Preventing the advancement of fluid to fluid lines 118 and 120 allows the fluid back pressure present in fluid lines 118 and 120 to be reduced as a result of advancing a volume of fluid through fixed orifice 70. Reducing the fluid back pressure in fluid lines 118 and 120 allows poppet 152 in hot fluid return valve 54 to move so as to allow the fluid to flow through hot source input 58 and hot source output 60 of hot fluid return valve 54. Allowing the fluid to flow through hot source input 58 and hot source output 60 positions hot fluid return valve 54 in the open hot fluid return position. It should be appreciated that when hot fluid return valve 54 is positioned in the open hot fluid return position, the fluid back pressure within fluid lines 114 and 140 is reduced to a value below 400 psi. Having a fluid back pressure below 400 psi allows the spring load in cold fluid return valve 62 to position cold fluid return valve 62 in the closed cold fluid return position. Having cold fluid return valve 62 in the closed cold fluid return position results in substantially all of the fluid being advanced to cooling fluid return line 36 via hot fluid return valve 54. Once in cooling fluid return line 36, the fluid is advanced to end portion 40 as indicated by arrowheads 134. Once the fluid reaches end portion 40, the fluid is sprayed onto a sidewall 18 of differential housing 12 via orifices 42 as indicated by arrows 136. Note that orifices 42 are positioned above a fluid pool 160 positioned within internal component chamber 20. Spraying the fluid onto sidewall 18 results in the fluid running down sidewall 18. Causing the fluid to run down sidewall 18 results in the fluid being cooled via heat transfer between sidewall 18 and the fluid. In addition, spraying the fluid on sidewall 18 places the fluid within internal component chamber 20 so that the fluid returns to fluid pool 160 located within internal component chamber 20. Having the fluid pooled within internal component chamber allows the fluid to circulate around, lubricate, and cool right wheel group 128 and left wheel group 130. It should also be appreciated that after the fluid is placed within internal component chamber 20 in the above described manner, the fluid can (i) slowly reenter differential sump 22 via sump orifice 76 and be circulated through temperature controlling fluid circuit 80 or (ii) be circulated through sensing fluid circuit 78.

It should be appreciated that the above described arrangement results in the fluid being preferentially advanced to a location within differential sump 22 during cold start up conditions. In particular, during cold start up conditions the temperature of the fluid is less than 120°, therefore, as described above, diverter valve 28 is located in the heating position. Having diverter valve 28 located in the heating position results in the advancement of the fluid circulating through temperature controlling circuit 80 to a location within differential sump 22. In addition, the fluid circulating through temperature sensing fluid circuit 78 is continuously being advanced to a location within differential sump 22. Advancing the fluid circulating through temperature controlling fluid circuit 80 and temperature sensing fluid circuit 78 to a location within differential sump 22 causes the fluid level within differential sump 22 to rise to a cold fluid level 158 as schematically illustrated in FIG. 1. Having the fluid within differential sump 22 at cold fluid level 158 results in gear 154 being substantially submerged in the fluid. Having gear 154 substantially submerged in the fluid, as compared to when a smaller portion is submerged, results in the fluid being heated more efficiently as gear 154 rotates therethrough. Therefore, as gear 154 rotates the temperature of the fluid is raised relatively quickly to within the appropriate predetermined temperature range. However, substantially submerging, and then rotating gear 154 through the fluid does result in the work machine losing horse power.

On the other hand, it should also be appreciated that the above described arrangement preferentially advances the fluid to a location outside differential sump 22 once the fluid attains a temperature equal to, or greater than, 120°. In particular, after a certain period of time of performing work functions the temperature of the fluid becomes substantially equal to or greater than 120°, therefore, as described above, diverter valve 28 is located in the cooling position. Having diverter valve 28 located in the cooling position results in the advancement of the fluid circulating through temperature controlling fluid circuit 80 to a location outside of differential sump 22. Note that the fluid circulating through temperature sensing fluid circuit 78 is continuously being advanced to a location within differential sump 22. Advancing the fluid circulating through temperature controlling fluid circuit 80 to a location outside of differential sump 22 causes the fluid level within differential sump 22 to lower to hot fluid level 14 as schematically illustrated in FIG. 1. Having the fluid within differential sump 22 at hot fluid level 14 results in gear 154 being positioned above the fluid. In other words, no portion of gear 154 is submerged in the fluid which prevents the above described horse power loss.

However, note that even though no portion of gear 154 is submerged in the fluid, enough fluid is still advanced into differential sump 22 to adequately lubricate gear 154 and the other components contained therein as a result of fluid advancement by other means. For example, the advancement of fluid into differential sump 22 via temperature sensing fluid circuit 78 ensures that the components contained therein are adequately lubricated.

Thus, it should be appreciated that having (i) a relatively high fluid level (i.e. cold fluid level 158) within differential sump 22 during cold start up conditions and (ii) a relatively low fluid level (i.e. hot fluid level 14) once the fluid is heated to the appropriate temperature is an important aspect of the present invention. Specifically, this aspect of the present invention allows the fluid to be efficiently heated during cold start up conditions and then prevents the loss of horse power once the has fluid attained the appropriate temperature.

Heating the fluid with cold fluid return valve 62 in the above described manner is another important aspect of the present invention. Specifically, heating the fluid with cold fluid return valve 62 augments the heating that takes place as a result of the physical interaction between the fluid and the moving components (e.g. rotating gears) contained within internal component chamber 20 of the differential assembly 16. Therefore, the fluid is heated more efficiently and the amount of horsepower loss suffered by the work machine (not shown) is reduced. Moreover, the present invention ensures that the fluid is substantially kept within an appropriate predetermined temperature range, thereby preventing the fluid from becoming to hot as the work machine performs various work functions.

A further advantage of the present invention is that it ensures that right wheel group 128 and left wheel group 130 are always cooled and lubricated by the fluid. In particular, having poppet valve 48 positioned in the open poppet position only if solenoid 150 is electrically actuated ensures that the fluid will be diverted to internal component chamber 20 at a location outside of differential sump 22 in the event of an electrical failure. For example, if an electrical failure causes poppet valve 48 to be cut off from an electric current, then solenoid 150 will be deactuated. Deactuating solenoid 150 results in poppet valve 48 being positioned in the closed poppet position. Placing poppet valve 48 in the closed poppet position places diverter valve 28 in the cooling position. Having diverter valve 28 in the cooling position causes the fluid advanced by first operational pressure source 26 to be sprayed onto sidewalls 18 of differential housing 12 at a location outside of differential sump 22. Spraying the fluid onto sidewalls 18 of differential housing 12 at a location outside of differential sump 22 ensures that right wheel group 128 and left wheel group 130 are lubricated and cooled by the fluid.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. An apparatus for controlling temperature of fluid in a differential assembly, comprising:

a differential housing having a number of sidewalls which collectively define an internal component chamber, wherein (i) said internal component chamber has a differential sump located therein, and (ii) said differential sump has a sump input port defined therein;

a first operational pressure source which advances fluid from said internal component chamber of said differential housing;

a diverter valve which receives fluid advanced by said first operational pressure source from said internal component chamber, said diverter valve having a cold fluid output port and a hot fluid output port;

a heating fluid return line interposed between said cold fluid output port of said diverter valve and said sump input port of said differential sump; and a cooling fluid return line interposed between said hot fluid output port of said diverter valve and a housing input port of said differential housing, wherein said diverter valve is selectively operable between (i) a heating position in which fluid advanced by said first operational fluid source is diverted to said differential sump of said differential housing via said heating fluid return line, and (ii) a cooling position in which fluid advanced by said first operational fluid source is diverted to contact said number of sidewalls of said differential housing via said cooling fluid return line.

2. The apparatus of claim 1, wherein:

said cooling fluid return line (i) includes an end portion which extends into said internal component chamber of said differential housing, said end portion of said cooling fluid return line has a number of orifices defined therein, and advancement of fluid through said cooling fluid return line causes fluid to be (i) advanced out of said number of orifices, and (ii) directed against said number of sidewalls of said differential housing.

3. The apparatus of claim 1, further comprising:

a second operational pressure source which advances fluid from said internal component chamber of said differential housing; and a temperature sensor which is positioned in contact with fluid advanced by said second operational pressure source and generates a temperature signal in response thereto.

4. The apparatus of claim 3, wherein:

said diverter valve is positioned in said heating position if said temperature signal has a predetermined relationship with a temperature threshold, and said diverter valve is positioned in said cooling position if said temperature signal does not have a predetermined relationship with a temperature threshold.

5. The apparatus of claim 1, wherein said diverter valve includes:

a poppet valve interposed between an operational pressure source output junction and a poppet output junction, said poppet valve being selectively positionable between an open poppet position and a closed poppet position, a hot fluid return valve having (i) a control input coupled to said poppet output junction, (ii) a hot source input coupled to said operational pressure source output junction, and (iii) a hot source output coupled to said hot fluid output port, wherein said hot fluid return valve is selectively positionable between an open hot fluid return position and a closed hot fluid return position, a cold fluid return valve having (i) a cold source input coupled to said operational pressure source output junction, and (ii) a cold source output coupled to a cold fluid return output junction, wherein said cold fluid return valve is selectively positionable between an open cold fluid return position and a closed cold fluid return position, and a fixed orifice interposed between said cold fluid return output junction and said poppet output junction.

6. The apparatus of claim 5, wherein:

said hot fluid return valve is positioned in said closed hot fluid return position when said poppet valve is positioned in said open poppet position such that fluid is advanced through said cold fluid return valve whereby fluid is advanced to said differential sump of said differential housing via said heating fluid return line, and said hot fluid return valve is positioned in said open hot fluid return position when said poppet valve is positioned in said closed poppet position such that fluid is advanced through said hot fluid return valve whereby fluid is diverted to contact said number of sidewalls of said differential housing via said cooling fluid return line.

7. The apparatus of claim 5, wherein:

said cold fluid return valve is positioned in said open cold fluid return position when said poppet valve is positioned in said open poppet position such that fluid is advanced through said cold fluid return valve whereby fluid is advanced to said differential sump of said differential housing via said heating fluid return line, and said cold fluid return valve is positioned in said closed cold fluid return position when said poppet valve is positioned in said closed poppet position such that fluid is advanced through said hot fluid return valve whereby fluid is diverted to contact said number of sidewalls of said differential housing via said cooling fluid return line.

8. The apparatus of claim 5, further comprising (i) a second operational pressure source which advances fluid from said internal component chamber of said differential housing, and (ii) a temperature sensor which is positioned in contact with fluid advanced by said second operational pressure source and generates a temperature signal in response thereto, wherein:

said poppet valve is positioned in said closed poppet position so as to locate said diverter valve in said cooling position if said temperature signal has a predetermined relationship with a temperature threshold; and said poppet valve is positioned in said open poppet position so as to locate said diverter valve in said heating position if said temperature signal does not have a predetermined relationship with a temperature threshold.

9. The apparatus of claim 1, wherein:

when said diverter valve is positioned in said heating position, fluid advanced by said first operational fluid source is diverted to a location within said differential sump, and when said diverter valve is positioned in said cooling position, fluid advanced by said first operational fluid source is diverted to a location within said internal component chamber which is located outside of said differential sump.

10. The apparatus of claim 1, further comprising a sump orifice positioned within said internal component chamber which allows fluid to flow within said internal component chamber from a location outside of said differential sump to a location within said differential sump.

11. An apparatus for controlling temperature of fluid in a differential assembly, comprising:

a differential housing having a number of sidewalls which collectively define an internal component chamber, wherein (i) said internal component chamber has a differential sump located therein, and (ii) said differential sump has a sump input port defined therein;

a first operational pressure source which advances fluid from said internal component chamber of said differential housing;

a diverter valve which receives fluid advanced by said first operational pressure source from said internal component chamber, said diverter valve having a cold fluid output port and a hot fluid output port;

a heating fluid return line interposed between said cold fluid output port of said diverter valve and said sump input port of said differential sump;

a cooling fluid return line interposed between said hot fluid output port of said diverter valve and said housing input port of said differential housing;

a second operational pressure source which advances fluid from said internal component chamber of said differential housing; and a temperature sensor which is positioned in contact with fluid advanced by said second operational pressure source and generates a temperature signal in response thereto, wherein said diverter valve is selectively operable between (i) a heating position in which fluid advanced by said first operational fluid source is diverted to said differential sump of said differential housing via said heating fluid return line, and (ii) a cooling position in which fluid advanced by said first operational fluid source is diverted to contact said number of sidewalls of said differential housing via said cooling fluid return line.

12. The apparatus of claim 11, wherein:

said cooling fluid return line includes an end portion which extends into said internal component chamber of said differential housing, said end portion of said cooling fluid return line has a number of orifices defined therein, and advancement of fluid through said cooling fluid return line causes fluid to be (i) advanced out of said number of orifices, and (ii) directed against said number of sidewalls of said differential housing.

13. The apparatus of claim 11, wherein:

said diverter is positioned in said cooling position if said temperature signal has a predetermined relationship with a temperature threshold, and said diverter is positioned in said cooling position if said temperature signal does not have a predetermined relationship with a temperature threshold.

14. The apparatus of claim 11, wherein said diverter valve includes:

a poppet valve interposed between an operational pressure source output junction and a poppet output junction, said poppet valve being selectively positionable between an open poppet position and a closed poppet position, a hot fluid return valve having (i) a control input coupled to said poppet output junction, (ii) a hot source input coupled to said operational pressure source output junction, and (iii) a hot source output coupled to said hot fluid output port, wherein said hot fluid return valve is selectively positionable between an open hot fluid return position and a closed hot fluid return position, a cold fluid return valve having (i) a cold source input coupled to said operational pressure source output junction, and (ii) a cold source output coupled to a cold fluid return output junction, wherein said cold fluid return valve is selectively positionable between an open cold fluid return position and a closed cold fluid return position, and a fixed orifice interposed between said cold fluid return output junction and said poppet output junction.

15. The apparatus of claim 14, wherein:

said hot fluid return valve is positioned in said closed hot fluid return position when said poppet valve is positioned in said open poppet position such that fluid is advanced through said cold fluid return valve whereby fluid is advanced to said differential sump of said differential housing via said heating fluid return line, and said hot fluid return valve is positioned in said open hot fluid return position when said poppet valve is positioned in said closed poppet position such that fluid is advanced through said hot fluid return valve whereby fluid is diverted to contact said number of sidewalls of said differential housing via said cooling fluid return line.

16. The apparatus of claim 14, wherein:

said cold fluid return valve is positioned in said open cold fluid return position when said poppet valve is positioned in said open poppet position such that fluid is advanced through said cold fluid return valve whereby fluid is advanced to said differential sump of said differential housing via said heating fluid return line, and said cold fluid return valve is positioned in said closed cold fluid return position when said poppet valve is positioned in said closed poppet position such that fluid is advanced through said hot fluid return valve whereby fluid is diverted to contact said number of sidewalls of said differential housing via said cooling fluid return line.

17. The apparatus of claim 14, wherein:

said poppet valve is positioned in said closed poppet position so as to locate said diverter in said cooling position if said temperature signal has a predetermined relationship with a temperature threshold, and said poppet valve is positioned in said open poppet position so as to locate said diverter in said heating position if said temperature signal does not have a predetermined relationship with a temperature threshold.

18. The apparatus of claim 11, wherein:

when said diverter valve is positioned in said heating position, fluid advanced by said first operational fluid source is diverted to a location within said differential sump, and when said diverter valve is positioned in said cooling position, fluid advanced by said first operational fluid source is diverted to a location within said internal component chamber which is located outside of said differential sump.

19. The apparatus of claim 11, further comprising a sump orifice positioned within said internal component chamber which allows fluid to flow within said internal component chamber from a location outside of said differential sump to a location within said differential sump.

20. A method of controlling temperature of fluid in a differential housing, comprising the steps of:

advancing fluid with a pump from an internal component chamber of said differential housing into a diverter valve;

determining temperature of fluid in said internal component chamber;

diverting fluid advanced by said pump with said diverter valve to a location within a differential sump positioned within said internal component chamber of said differential housing if said temperature of fluid within said internal component chamber is determined to have a predetermined relation with a temperature threshold; and diverting fluid advanced by said pump with said diverter valve such that fluid advanced by said pump contacts a number of sidewalls of said differential housing at a location outside of said differential sump if said temperature of fluid within said internal component chamber is determined not to have a predetermined relation with said temperature threshold.

\* \* \* \* \*